US012748637B2

(12) United States Patent
Zeng et al.

(10) Patent No.: US 12,748,637 B2
(45) Date of Patent: Sep. 29, 2026

(54) SYNCHRONIZATION OF AUTOMATION SCRIPTS AMONG DIFFERENT COMPUTING SYSTEMS

(71) Applicant: International Business Machines Corporation, Armonk, NY (US)

(72) Inventors: Mai Zeng, Bei Jing (CN); Yu Mei Dai, Beijing (CN); Hui Wang, Beijing (CN); Wei Li, Beijing (CN); Xiao Chen Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 17/818,763

(22) Filed: Aug. 10, 2022

(65) Prior Publication Data

US 2024/0054025 A1 Feb. 15, 2024

(51) Int. Cl.
*G06F 9/52* (2006.01)

(52) U.S. Cl.
CPC .................................... *G06F 9/52* (2013.01)

(58) Field of Classification Search
CPC ... G06F 9/52; G06F 9/542; G06F 8/65; G06F 16/178
See application file for complete search history.

(56) References Cited

U.S. PATENT DOCUMENTS 7,076,783 B1 * 7/2006 Frank .................... H04L 43/103 719/313
7,437,614 B2 * 10/2008 Haswell .............. G06F 11/3684 714/E11.208
7,735,080 B2 * 6/2010 Barturen ................... G06F 8/71 717/121
8,195,608 B2 * 6/2012 Arcese .................. G06F 16/178 709/201
10,169,077 B1 1/2019 Sigl et al.
(Continued)

OTHER PUBLICATIONS

Anonymous, "A Method to Automatically Synchronize Configuration Files Between Disaster Recovery Environment Controller Systems." IP.com, May 23, 2021, 5 pages.
(Continued)

*Primary Examiner* — Jennifer N Welch
(74) *Attorney, Agent, or Firm* — Cantor Colburn LLP; Kelsey M. Skodje

(57) ABSTRACT

Embodiments include synchronization of automation files among different computing systems. Aspects include receiving a notification that an automation file on a first computing system has been updated, the notification including a first set of data including a timestamp corresponding to the update and comparing the timestamp to a second timestamp, wherein the second timestamp corresponds to the automation file stored on a second computing system. Based on determining a difference between the timestamps, aspects include transmitting a synchronization request to the second computing system. Based on receiving a notification that the second computing system successfully executed the synchronization request, aspects include updating a second set of data to match the first set of data. Based on receiving a notification that the second computing system failed to executed the synchronization request, aspects include notifying a user of a required update to the second computing system.

20 Claims, 5 Drawing Sheets

(56) References Cited

U.S. PATENT DOCUMENTS

| | | | | |
|---|---|---|---|---|
| 11,025,718 | B2 * | 6/2021 | Savage | H04L 67/1095 |
| 11,372,816 | B2 * | 6/2022 | Kambuj | G06F 16/178 |
| 11,809,381 | B2 * | 11/2023 | Kambuj | G06F 16/178 |
| 2004/0205748 | A1 | 10/2004 | Iyer | |
| 2008/0215639 | A1 * | 9/2008 | Rifkin | G06F 11/1451<br>707/999.203 |
| 2013/0238552 | A1 * | 9/2013 | Saib | G06F 16/178<br>707/E17.005 |
| 2017/0168903 | A1 | 6/2017 | Wallace et al. | |
| 2018/0189317 | A1 * | 7/2018 | Kambuj | G06F 16/178 |
| 2022/0318201 | A1 * | 10/2022 | Kambuj | G06F 16/178 |

OTHER PUBLICATIONS

Anonymous, "Rocket iCluster" https://www.rocketsoftware.com/products/rocket-icluster, 2022, 4 pages.

D. Clitherow et al., "GDPS: The Enterprise Continuous Availability / Disaster Recovery Solution." http://itic-corp.com/blog/2016/08/cost-of-hourly-downtime-soars-81-of-enterprises-say-it-exceeds-300k-on-average. Apr. 2018, 21 pages.

* cited by examiner

SYNCHRONIZATION OF AUTOMATION SCRIPTS AMONG DIFFERENT COMPUTING SYSTEMS

BACKGROUND

The present invention generally relates to computer systems, and more specifically, to computer systems, computer-implemented methods, and computer program products for synchronization of automation scripts among different computing systems.

Often users maintain many computing systems that are used for different purposes in cloud environments. For example, a user may maintain two computing systems, also referred to as computing clusters, where one is utilized as a testing environment and the others are for the production environment. One example of a computing system is a systems complex, also referred to as a sysplex, which is a high-availability system that allows multiple logical partitions to communicate and coordinate synchronized data storage and access for large-scale data storage and management.

Large-scale computing systems include many components, such as applications and middleware, that are running on a mainframe operating system. For such complex computing systems, it is common to utilize system automation tools to control the shutdown and startup of the system and to monitor the operation of the system. To automatically control the mainframe environment, users update automation files provided by system automation which requires the user to change various configurations and update contents in multiple locations.

SUMMARY

Embodiments of the present invention are directed to synchronization of automation scripts among different computing systems. According to an aspect, a computer-implemented method includes receiving a notification that an automation file on a first computing system has been updated, the notification including a first set of data including a timestamp corresponding to the update and comparing the timestamp to a second timestamp, wherein the second timestamp corresponds to the automation file stored on a second computing system. Based on determining a difference between the first timestamp and the timestamp, the method includes transmitting a synchronization request to the second computing system, the synchronization including the first set of data. Based on receiving a notification that the second computing system successfully executed the synchronization request, the method includes updating a second set of data to match the first set of data. Based on receiving a notification that the second computing system failed to executed the synchronization request, the method further includes notifying a user of a required update to the second computing system.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
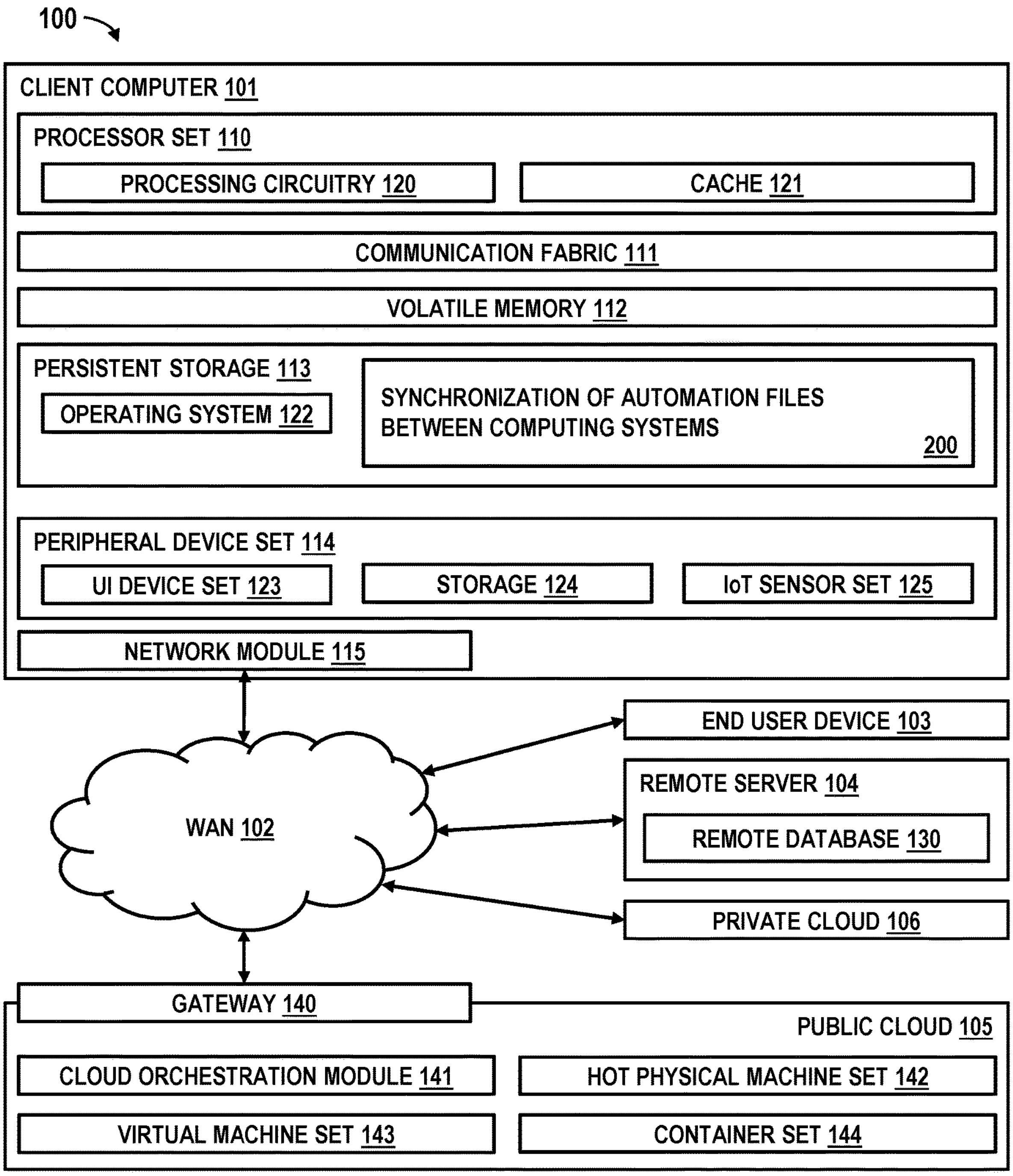
FIG. 1 depicts a block diagram of an example computer system for use in conjunction with one or more embodiments of the present invention.

As discussed above, automation tools are often used to control the startup and shutdown or to monitor a computing system. The automation tools rely on automation files that may be updated frequently. In many cases, updating the automation files involves making many changes that often involve changes to data and files in multiple locations. In many cases, users maintain two or more computing systems, such as a production computing system and a testing computer system, which are required to be in the same state. Accordingly, when a user updates an automation file in a testing computing system, and the same changes need to be made in the production computing system. Currently, updating these automation files is a manual process, and errors made during the updates can cause the systems to be unreliable or suffer outages.

One or more embodiments of the present invention include methods, systems, and computer program products for automatically synchronizing automation files among different computing systems. In exemplary embodiments, a synchronization system is configured to communicate with the different computing systems and the synchronization system includes a dashboard interface that is used to control the synchronization among the different computing systems. In exemplary embodiments, the synchronization system maintains a map file that is configured to store the information for the synchronization process, including the synchronization data, source, and destination.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the synchronization of automation files between computing systems 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In exemplary embodiments, a system for automatically synchronizing automation files among different computing systems is provided. In exemplary embodiments, the system includes a synchronization system configured to communicate with the different computing systems. The synchronization system includes a dashboard interface that is used to control the synchronization among the different computing systems. In exemplary embodiments, the synchronization system maintains a map file that is configured to store the information for the synchronization process, including the synchronization data, source, and destination.

Figure 2:
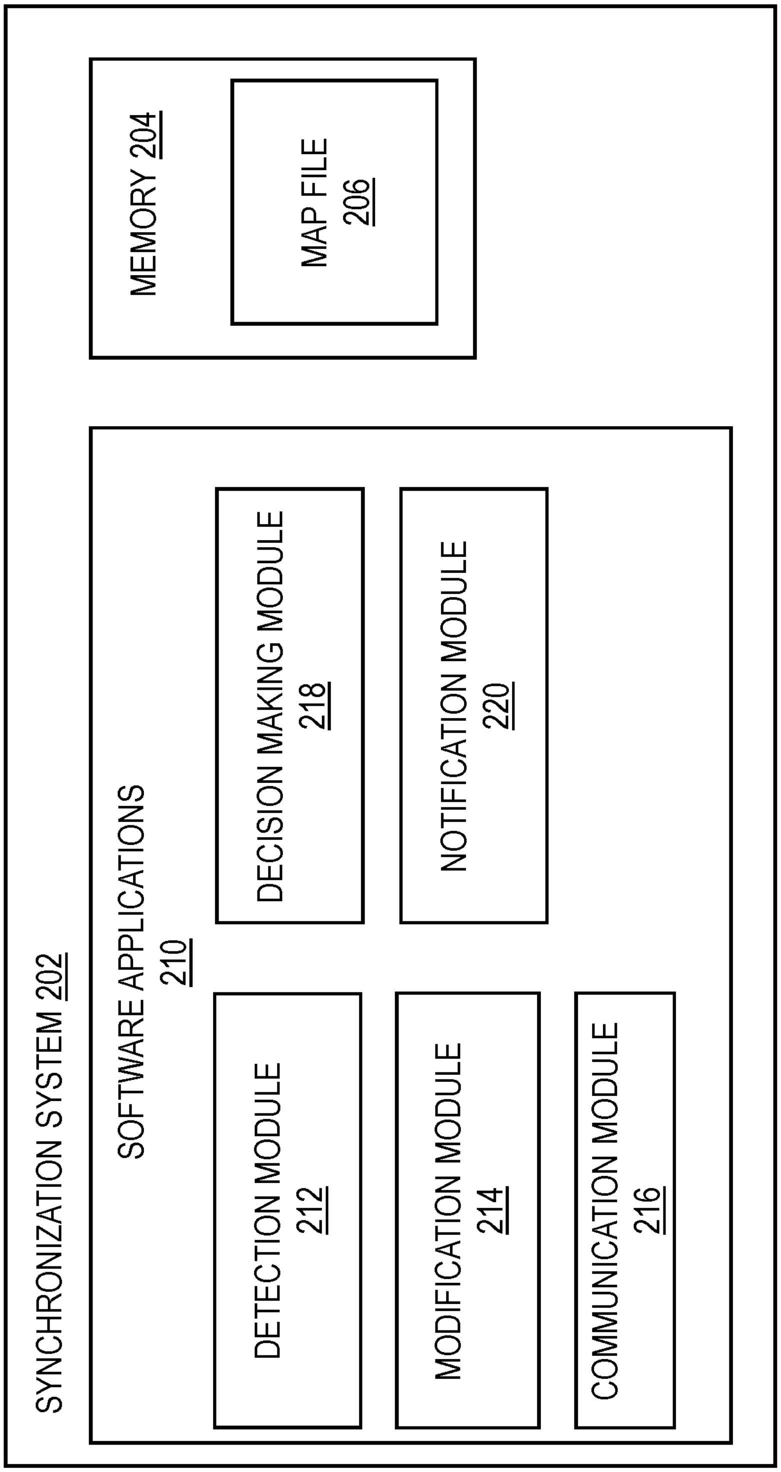
FIG. 2 is a block diagram of a synchronization system for use in conjunction with one or more embodiments of the present invention.

Referring now to FIG. 2, a block diagram of a synchronization system 202 for use in conjunction with one or more embodiments of the present invention is shown. In exemplary embodiments, the synchronization system 202 may be embodied in a computer 101 as shown in FIG. 1. As illustrated, the synchronization system 202 includes a memory 204 that is configured to store a map file 206. In exemplary embodiments, the map file 206 stores information that is used by the synchronization process. The information stored in the map file includes a name of each automation file stored on each computing system, a location of each automation file stored on each computing system, a timestamp that each automation file stored on each computing system was last updated, and the like. In exemplary embodiments, the memory 204 may also store copies of each automation file stored on each computing system.

The synchronization system 202 also includes software applications 210 that include a detection module 212, a modification module 214, a communications module 216, a decision-making module 218, and a notification module 220. In exemplary embodiments, the detection module 212 is configured to detect an update to an automation file on one or more computing systems in communication with the synchronization system 200. In exemplary embodiments, the modification module 214 is configured to modify the map file 206 based on the detected updates to the automation files. The communications module 216 is configured to enable communications between the synchronization system 202 and one or more computing systems.

In exemplary embodiments, the decision-making module 218 is configured to compare the information received by the detection module 212 with the data stored in the map file 206 and to determine whether the information received by the detection module 212 should be provided to any additional computing systems. For example, the decision-making module 218 may determine that a first computing system has updated an automation file that is also present on a second computing system and that the automation file on the second computing system needs to be updated to match the updates made on the first computing system. In addition, the decision-making module 218 may be configured to notify the connected computing systems regarding the success or failure of synchronization of an automation file. In exemplary embodiments, the notification module 220 is configured to transmit notifications based on the decision-making module 218.

Figure 3:
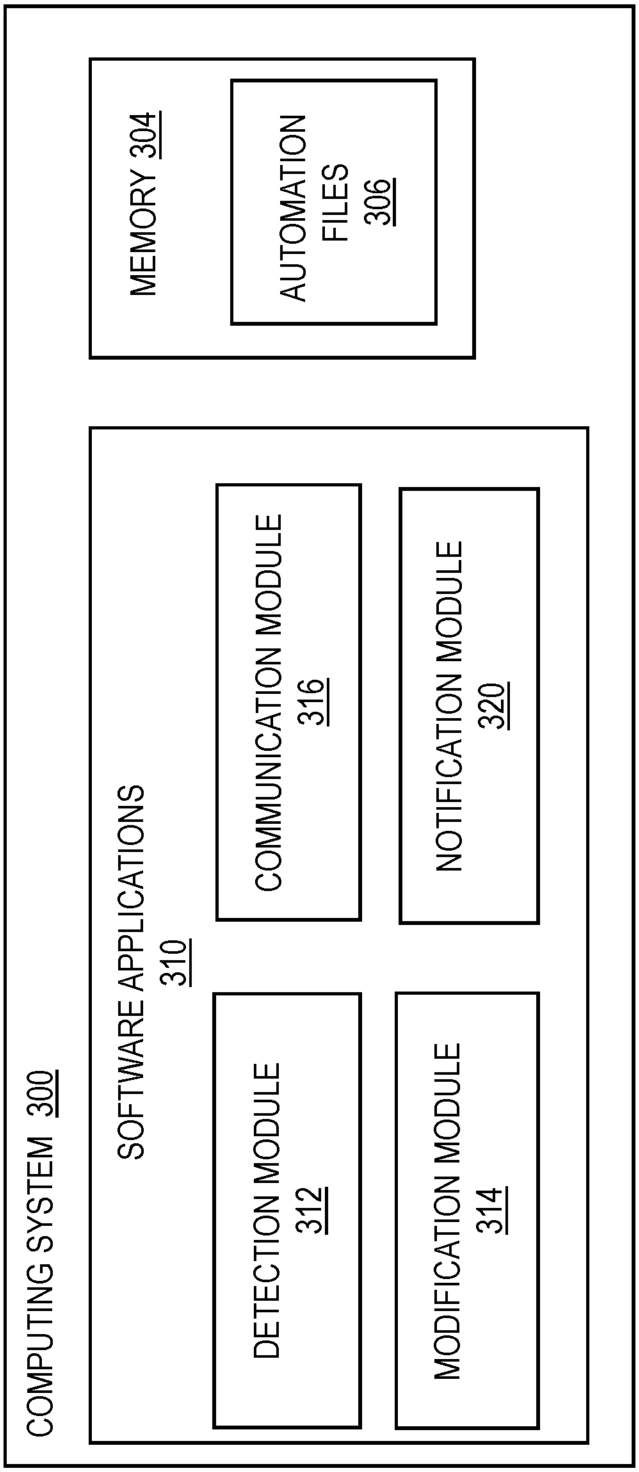
FIG. 3 is a block diagram of a computer system for use in conjunction with one or more embodiments of the present invention.

Referring now to FIG. 3, a block diagram of a computing system 300 for use in conjunction with one or more embodiments of the present invention is shown. In exemplary embodiments, the computing system 300 may be embodied in a computer system 100 as shown in FIG. 1. As illustrated, the computing system 300 includes a memory 304 that stores one or more automation files 306 that are used to automate the operation of the computing system 300.

The computing system 300 also includes software applications 310 that include a detection module 312, a modification module 314, a communications module 316, and a notification module 320. In exemplary embodiments, the detection module 312 is configured to detect an update to one or more of the automation files 306. In addition, the detection module 312 is configured to detect a modification request received by the computing system 300 from another computing system or the synchronization system. In exemplary embodiments, the modification module 314 is configured to update the automation files 306 based on a received modification request, also referred to as a synchronization request. The communications module 316 is configured to enable communications between the computing system 300 and one or more additional computing systems and the synchronization system. In exemplary embodiments, the notification module 320 is configured to transmit notifications to one or more additional computing systems and the synchronization system.

Figure 4:
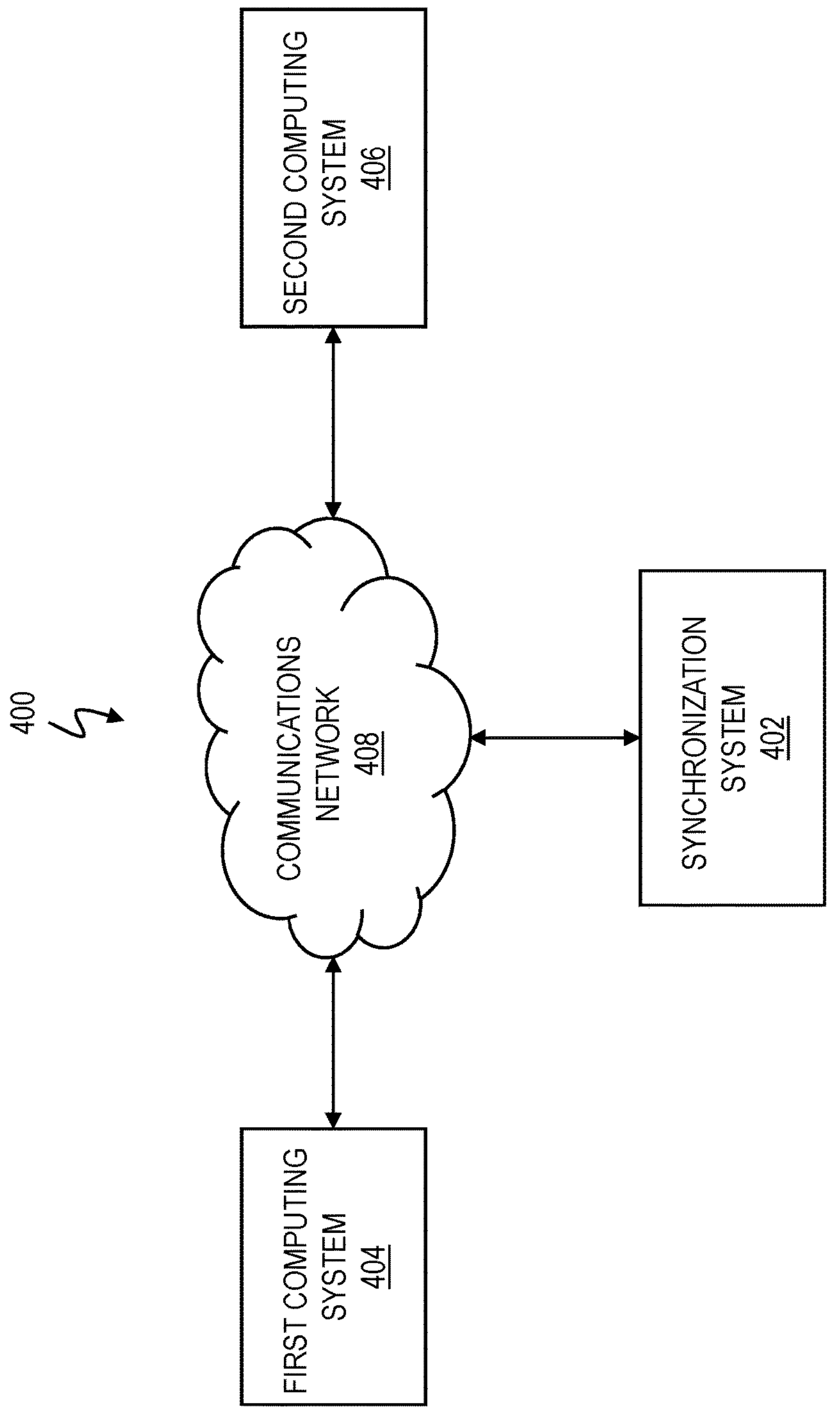
FIG. 4 depicts an example of a system for synchronization of automation files among different computing systems in accordance with one or more embodiments of the present invention.

Referring now to FIG. 4 an example of a system 400 for synchronization of automation files among different computing systems in accordance with one or more embodiments of the present invention is shown. As shown, the system 400 includes a synchronization system 402, a first computing system 404, and a second computing system 406 that are in communication with one another via a communications network 408. In one embodiment, the first computing system 404 is a testing environment and the second computing system 406 is a production environment. The synchronization system 402 is configured to synchronize automation files on the first computing system 404 and the second computing system.

In exemplary embodiments, the synchronization system 402 includes a map file that stores information corresponding to each automation file stored on both the first computing system 404 and the second computing system 406. The information includes a location of each of the automation files and a timestamp of when each automation file was last updated. During operation, when a modifies an automation file in the first computing system, the first computing system 404 will notify the synchronization system 402 of the update. The synchronization system 402 will then update the map file and determine whether an automation file in the second computing system 406 needs to be updated based on the information in the map file.

In one embodiment, if an update is needed to the automation files of the second computing system 406, the synchronization system 402 may instruct the second computing system 406 to perform the needed update and provide the data necessary to perform the update. In another embodiment, if an update is needed to the automation files of the second computing system 406, the synchronization system 402 may notify the second computing system 406 of the needed update, and the second computing system 406 may obtain the data needed to perform the update directly from the first computing system 404. In exemplary embodiments, the second computing system 406 is further configured to notify the synchronization system 402 whether the update to the automation files was successful or a failure so that the synchronization system 402 can keep the map file up to date.

In one embodiment, if an update is needed to the automation files of the second computing system 406, the modifications are performed immediately. In another embodiment, if an update is needed to the automation files of the second computing system 406, the modifications are scheduled to be performed at a time set by a user, such as during a scheduled maintenance or downtime.

Figure 5:
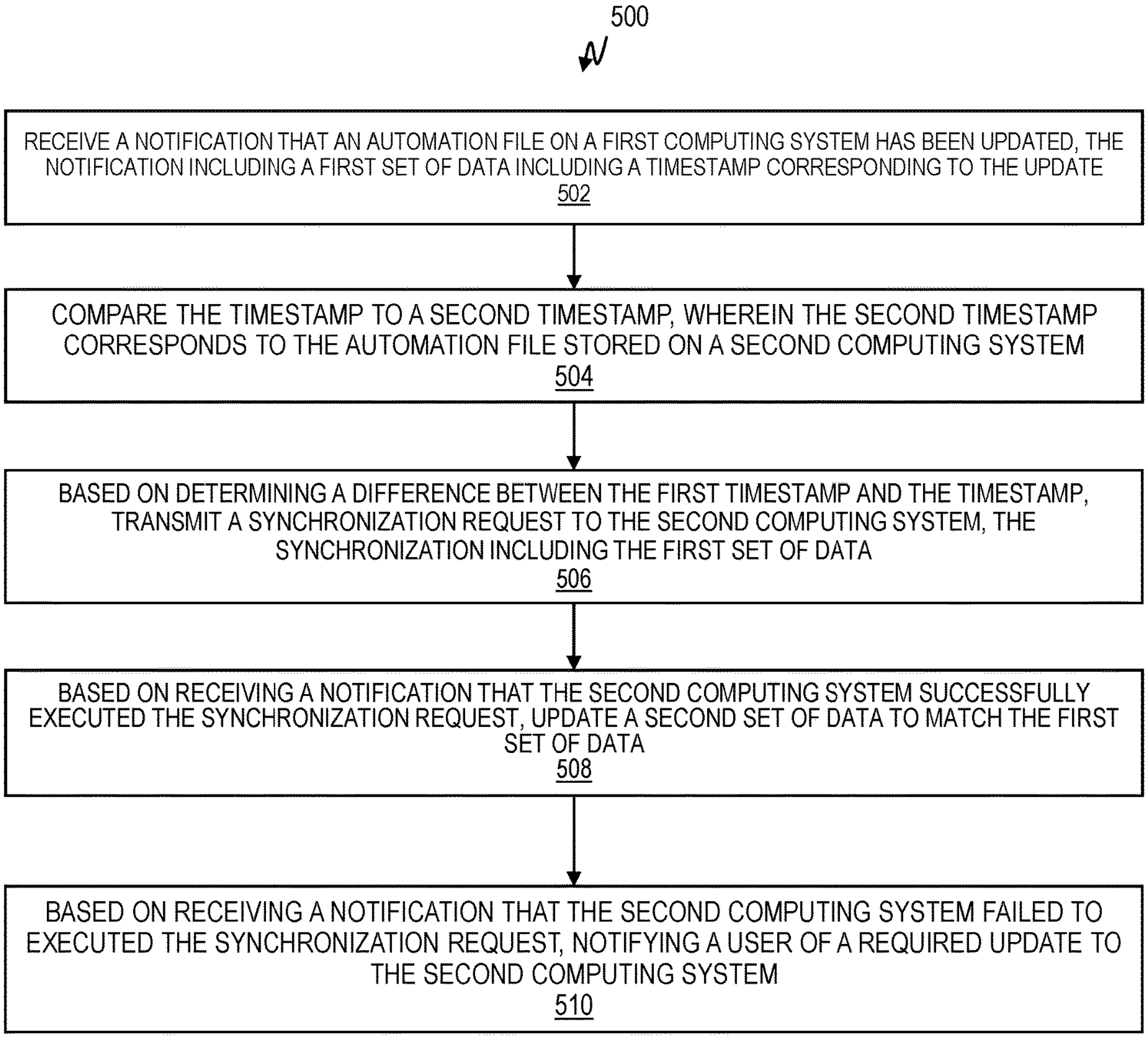
FIG. 5 is a flowchart of a method for synchronization of automation scripts among different computing systems in accordance with one or more embodiments of the present invention.

Referring now to FIG. 5 a flowchart 500 of a method for synchronization of automation scripts among different computing systems according to an embodiment. The flowchart 500 is described in reference to FIGS. 1-4 and may include additional steps not depicted in FIG. 5. Although depicted in a particular order, the blocks depicted in FIG. 5 can be rearranged, subdivided, and/or combined. As shown at block 502, the method 500 includes receiving a notification that an automation file on a first computing system has been updated. In exemplary embodiments, the notification includes a first set of data including a timestamp corresponding to the update. In exemplary embodiments, the first set of data further includes a file name of the automation file and a location of the automation file on the first computing system.

Next, as shown at block 504, the method 500 includes comparing the timestamp to a second timestamp, wherein the second timestamp corresponds to the automation file stored on a second computing system. Based on determining a difference between the first timestamp and the timestamp, the method 500 includes transmitting a synchronization request to the second computing system, the synchronization including the first set of data, as shown at block 506. In one embodiment, the synchronization request instructs the second computing system to obtain the first set of data from the first computing system and to update the automation file stored on the second computing system based on the first set of data. In another embodiment, the synchronization request includes the first set of data and instructs the second computing system to update the automation file stored on the second computing system based on the first set of data.

The method 500 also includes updating a second set of data to match the first set of data based on receiving a notification that the second computing system successfully executed the synchronization request, as shown at block 508. In exemplary embodiments, the second set of data includes the second timestamp, a file name of the automation file and a location of the automation file on the second computing system. In one embodiment, the first set of data and the second set of data are stored in a map file. The method 500 further includes notifying a user of a required update to the second computing system based on receiving a notification that the second computing system failed to execute the synchronization request, as shown at block 510.

Technical advantages and benefits include automated synchronization of automation files among different computer systems. By automating the synchronization of automation files among different computer systems users are no longer required to update the automation files separately and manually for multiple computer systems. Automating the synchronization of automation files will reduce the errors that may be introduced by multiple manual applications of multiple updates.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

maintaining, by a synchronization system, a map file storing synchronization information including synchronization data identifying a source computing system and a destination computing system;

presenting, via a dashboard interface of the synchronization system, controls to schedule synchronization among different computing systems;

receiving, via the dashboard interface, user input specifying a time set by a user for performing synchronization, during a scheduled maintenance or downtime;

receiving a notification that an automation file on a first computing system has been updated, the notification including a first set of data including a first timestamp corresponding to the update;

comparing the first timestamp to a second timestamp, wherein the second timestamp corresponds to the automation file stored on a second computing system;

based on determining a difference between the first timestamp and the second timestamp, transmitting, at the time set by the user, a synchronization request to the second computing system, the synchronization including the first set of data, wherein the synchronization request instructs the second computing system to obtain the first set of data from the first computing system and to update the automation file stored on the second computing system based on the first set of data;

based on receiving a notification that the second computing system successfully executed the synchronization request, updating a second set of data to match the first set of data; and based on receiving a notification that the second computing system failed to execute the synchronization request, notifying a user of a required update to the second computing system.

2. The computer-implemented method of claim 1, wherein the first set of data further includes a file name of the automation file and a location of the automation file on the first computing system.

3. The computer-implemented method of claim 1, wherein the second set of data includes the second timestamp, a file name of the automation file and a location of the automation file on the second computing system.

4. The computer-implemented method of claim 1, wherein the first set of data and the second set of data are stored in the map file.

5. The computer-implemented method of claim 1, wherein the first computing system is a testing environment and the second computing system is a production environment.

6. The computer-implemented method of claim 1, wherein the map file stores information corresponding to each automation file stored on both the first computing system and the second computing system, the information including a location of each automation file and a timestamp of when each automation file was last updated.

7. The computer-implemented method of claim 1, wherein the first set of data further includes a file name of the automation file and a location of the automation file on the first computing system.

8. The computer-implemented method of claim 1, wherein the synchronization system includes a detection module configured to detect the update to the automation file on the first computing system, and a modification module configured to modify the map file based on the detected update.

9. The computer-implemented method of claim 1, further comprising comparing, by a decision-making module of the synchronization system, information received by a detection module with data stored in the map file to determine that the automation file on the second computing system needs to be updated to match updates made to the automation file on the first computing system.

10. The computer-implemented method of claim 1, wherein the second computing system includes a modification module configured to update the automation file based on the synchronization request, the synchronization request comprising a modification request received by the second computing system from the synchronization system.

11. The computer-implemented method of claim 1, wherein the synchronization system notifies one or more connected computing systems regarding success or failure of synchronization of the automation file.

12. A system comprising:

a memory having computer readable instructions; and one or more processors for executing the computer readable instructions, the computer readable instructions controlling the one or more processors to perform operations comprising:

maintaining, by a synchronization system, a map file storing synchronization information including synchronization data identifying a source computing system and a destination computing system;

presenting, via a dashboard interface of the synchronization system, controls to schedule synchronization among different computing systems;

receiving, via the dashboard interface, user input specifying a time set by a user for performing synchronization, during a scheduled maintenance or downtime;

receiving a notification that an automation file on a first computing system has been updated, the notification including a first set of data including a first timestamp corresponding to the update;

comparing the first timestamp to a second timestamp, wherein the second timestamp corresponds to the automation file stored on a second computing system;

based on determining a difference between the first timestamp and the second timestamp, transmitting, at the time set by the user, a synchronization request to the second computing system, the synchronization including the first set of data, wherein the synchronization request instructs the second computing system to obtain the first set of data from the first computing system and to update the automation file stored on the second computing system based on the first set of data;

based on receiving a notification that the second computing system successfully executed the synchronization request, updating a second set of data to match the first set of data; and based on receiving a notification that the second computing system failed to execute the synchronization request, notifying a user of a required update to the second computing system.

13. The system of claim 12, wherein the first set of data further includes a file name of the automation file and a location of the automation file on the first computing system.

14. The system of claim 12, wherein the second set of data includes the second timestamp, a file name of the automation file and a location of the automation file on the second computing system.

15. The system of claim 12, wherein the first set of data and the second set of data are stored in the map file.

16. The system of claim 12, wherein the first computing system is a testing environment and the second computing system is a production environment.

17. A computer program product comprising a computer readable storage medium having program instructions embodied therewith, the program instructions executable by one or more processors to cause the one or more processors to perform operations comprising:

maintaining, by a synchronization system, a map file storing synchronization information including synchronization data identifying a source computing system and a destination computing system;

presenting, via a dashboard interface of the synchronization system, controls to schedule synchronization among different computing systems;

receiving, via the dashboard interface, user input specifying a time set by a user for performing synchronization, during a scheduled maintenance or downtime;

receiving a notification that an automation file on a first computing system has been updated, the notification including a first set of data including a first timestamp corresponding to the update;

comparing the first timestamp to a second timestamp, wherein the second timestamp corresponds to the automation file stored on a second computing system;

based on determining a difference between the first timestamp and the second timestamp, transmitting, at the time set by the user, a synchronization request to the second computing system, the synchronization including the first set of data, wherein the synchronization request instructs the second computing system to obtain the first set of data from the first computing system and to update the automation file stored on the second computing system based on the first set of data;

based on receiving a notification that the second computing system successfully executed the synchronization request, updating a second set of data to match the first set of data; and based on receiving a notification that the second computing system failed to execute the synchronization request, notifying a user of a required update to the second computing system.

18. The computer program product of claim 17, wherein the first set of data further includes a file name of the automation file and a location of the automation file on the first computing system.

19. The computer program product of claim 17, wherein the second set of data includes the second timestamp, a file name of the automation file and a location of the automation file on the second computing system.

20. The computer program product of claim 17, wherein the first set of data and the second set of data are stored in the map file.

* * * * *